United States Patent
Pfister

(10) Patent No.: US 7,587,780 B2
(45) Date of Patent: Sep. 15, 2009

(54) SHOE CLEANING SAND RAKE

(76) Inventor: John G. Pfister, 3610 W. Hamilton Rd., Fort Wayne, IN (US) 46814

( * ) Notice: Subject to any disclaimer, the term of this patent is extended or adjusted under 35 U.S.C. 154(b) by 37 days.

(21) Appl. No.: 11/866,499

(22) Filed: Oct. 3, 2007

(65) Prior Publication Data

US 2008/0110149 A1 May 15, 2008

Related U.S. Application Data

(62) Division of application No. 11/395,595, filed on Mar. 31, 2006, now abandoned.

(60) Provisional application No. 60/733,691, filed on Nov. 4, 2005.

(51) Int. Cl.
*A01D 7/06* (2006.01)

(52) U.S. Cl. .................. 15/105; 56/400.06; 56/400.21; 15/142; 15/160; 15/106; D4/136; D8/13

(58) Field of Classification Search .................. 15/105, 15/142, 159.1; D8/13; D4/119–120, 136; 56/400.1, 400.04–400.06, 400.08, 400.17–400.2
See application file for complete search history.

(56) References Cited

U.S. PATENT DOCUMENTS

| | | | | |
|---|---|---|---|---|
| 154,715 | A | * | 9/1874 | Reed ............................ 15/112 |
| 1,115,881 | A | * | 11/1914 | West ....................... 56/400.04 |
| 1,800,103 | A | | 4/1931 | Pihl |
| 3,968,535 | A | * | 7/1976 | Nichols, Jr. .................. 15/105 |
| 4,174,003 | A | | 11/1979 | Zepeda |
| 4,741,150 | A | | 5/1988 | Saksun |
| 5,179,825 | A | | 1/1993 | Griffiths et al. |
| D372,128 | S | * | 7/1996 | Beach et al. ................. D4/116 |
| 5,607,424 | A | | 3/1997 | Tropiano |
| D392,854 | S | | 3/1998 | Gregory |
| 5,758,480 | A | | 6/1998 | Creasy |
| D397,592 | S | | 9/1998 | Widmer |
| 5,927,057 | A | | 7/1999 | Hueber |
| 6,761,021 | B1 | | 7/2004 | Snyder |

OTHER PUBLICATIONS

Closely. www.dictionary.reference.com/browse/closely. May 1, 2007.
Paraide Golf Product Web Page—Spike and Shoe Cleaners—2 pages.

* cited by examiner

*Primary Examiner*—Shay L Karls
(74) *Attorney, Agent, or Firm*—Baker & Daniels LLP

(57) ABSTRACT

A sand rake which serves two purposes: 1) raking the sand in a bunker to provide a smooth sand surface; and 2) efficient and safe removal of the sand trapped or lodged on or near the soles of a player's golf shoes. The dual purpose sand rake may be used to conveniently clean the player's shoes before stepping foot on the putting green, thereby reducing the amount of sand and other debris tracked onto the green, or, alternatively, before the player attempts another shot, thereby enhancing the player's footing. The sand rake removes the need for the player to walk to the next tee box or wait until the round is finished to clean his or her shoes. Moreover, the sand rake removes the need for the player to tap his or her shoes with the golf club to clean his or her shoes, thereby eliminating the risk of injury to the player's ankle or foot as well as damage to the shoes.

16 Claims, 5 Drawing Sheets

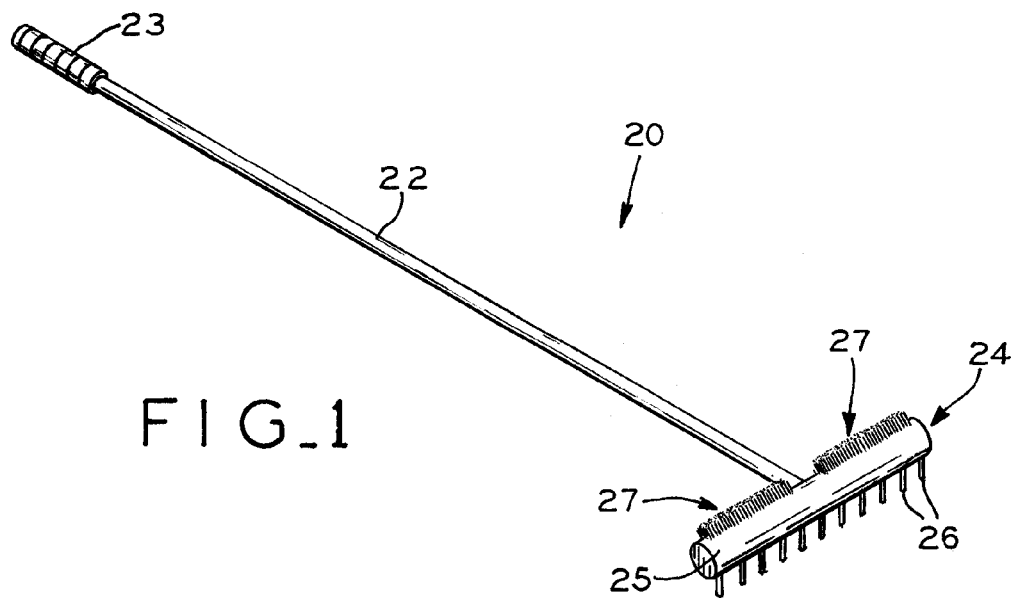
FIG_1
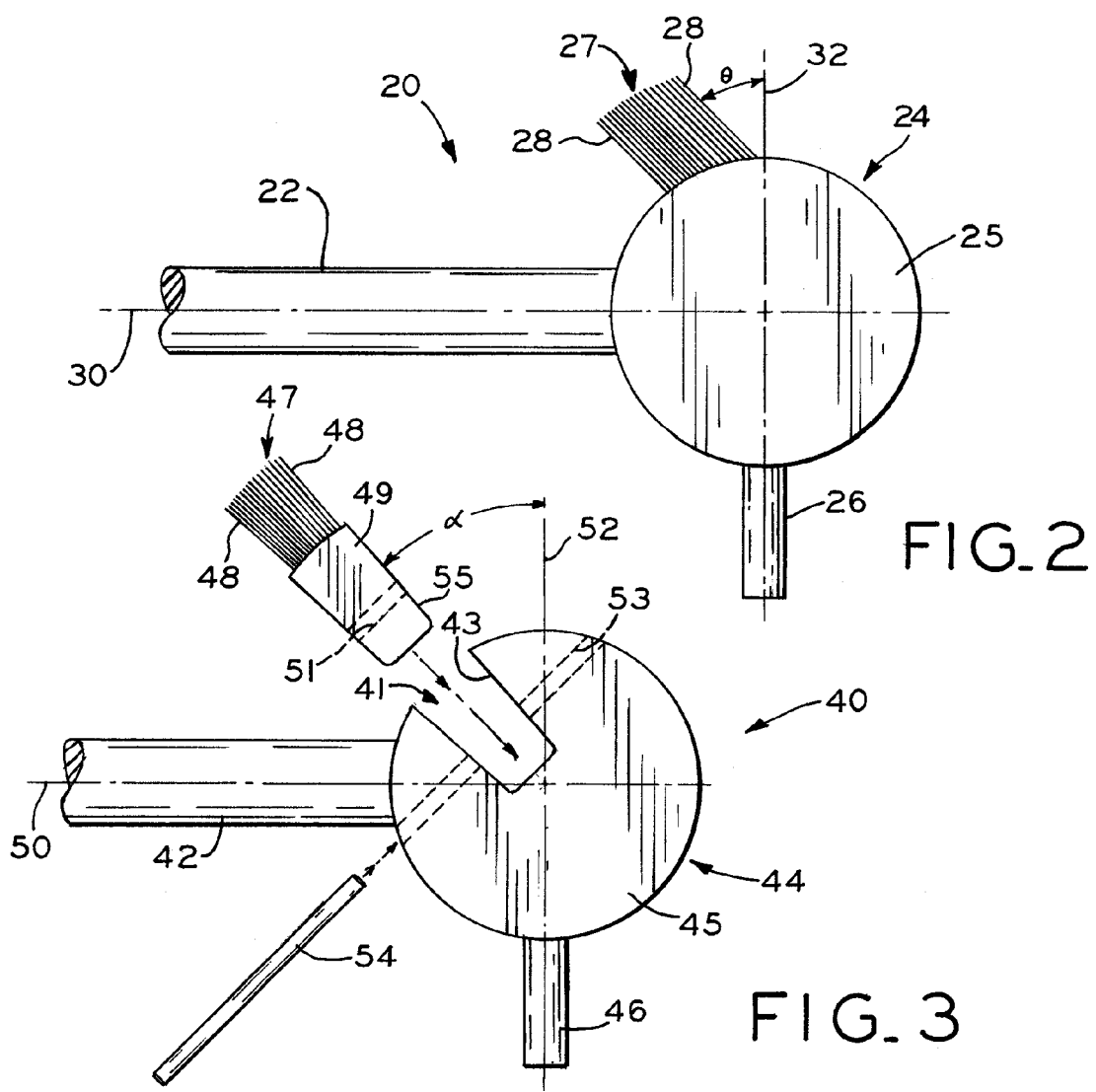
FIG_2
FIG_3

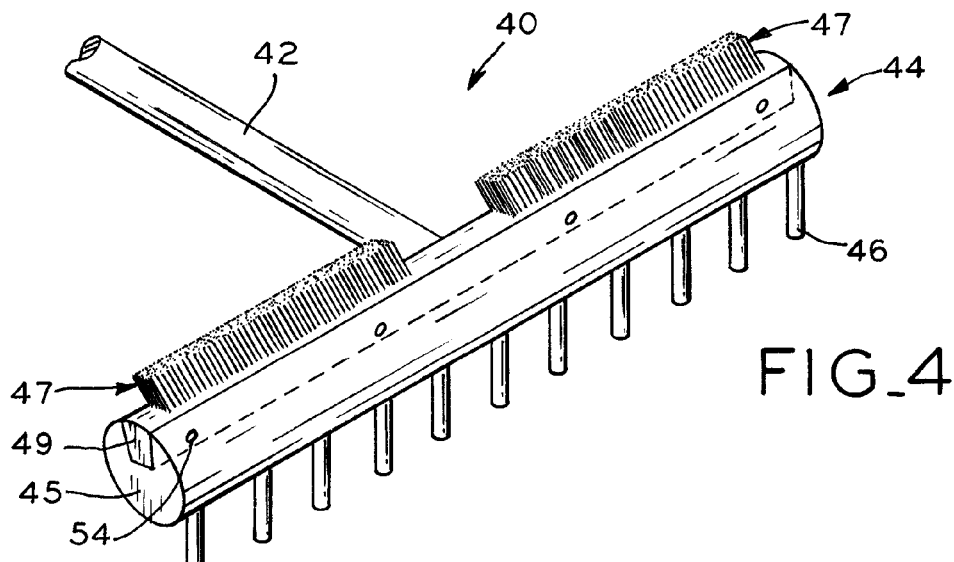
FIG_4
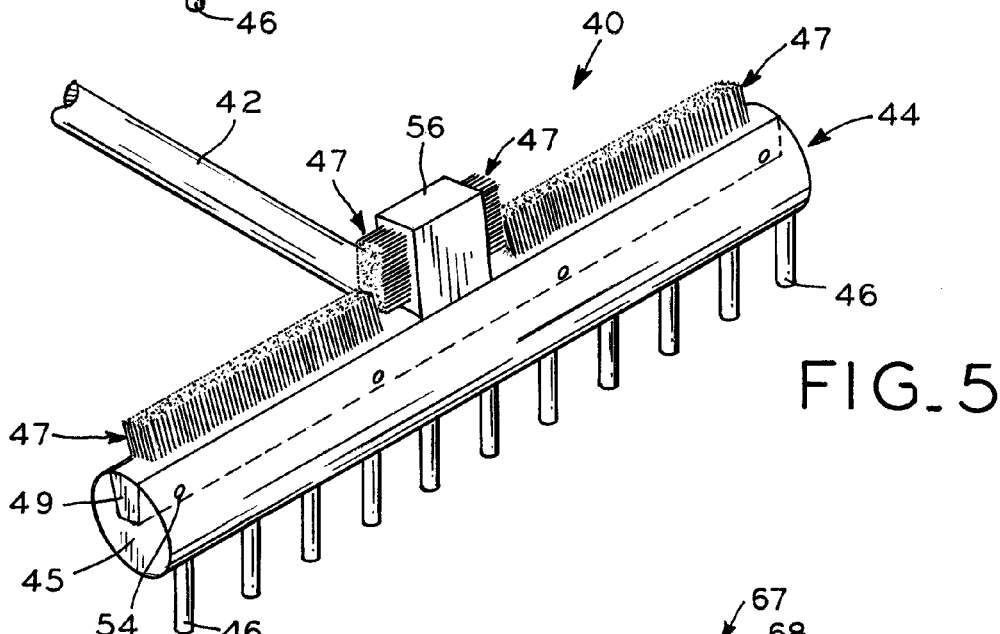
FIG_5
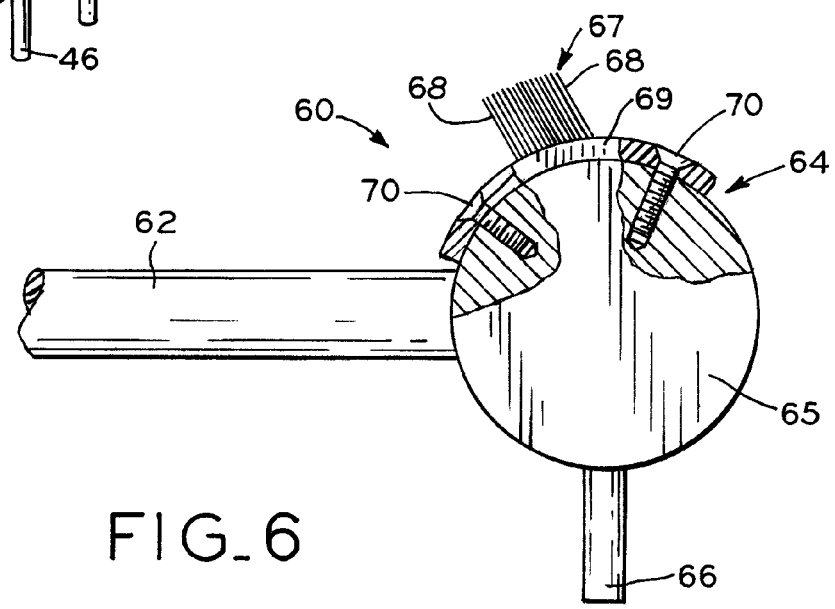
FIG_6

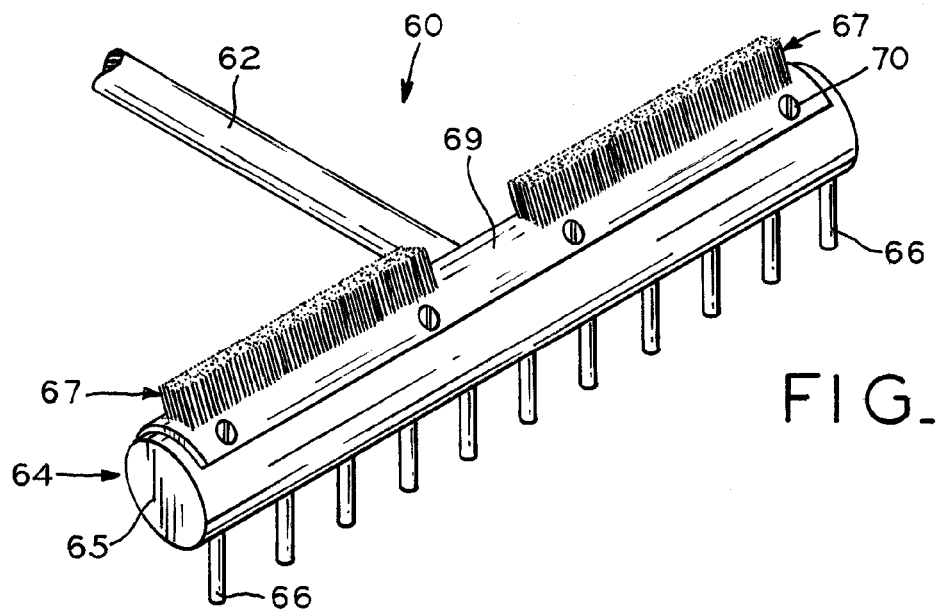
FIG_7
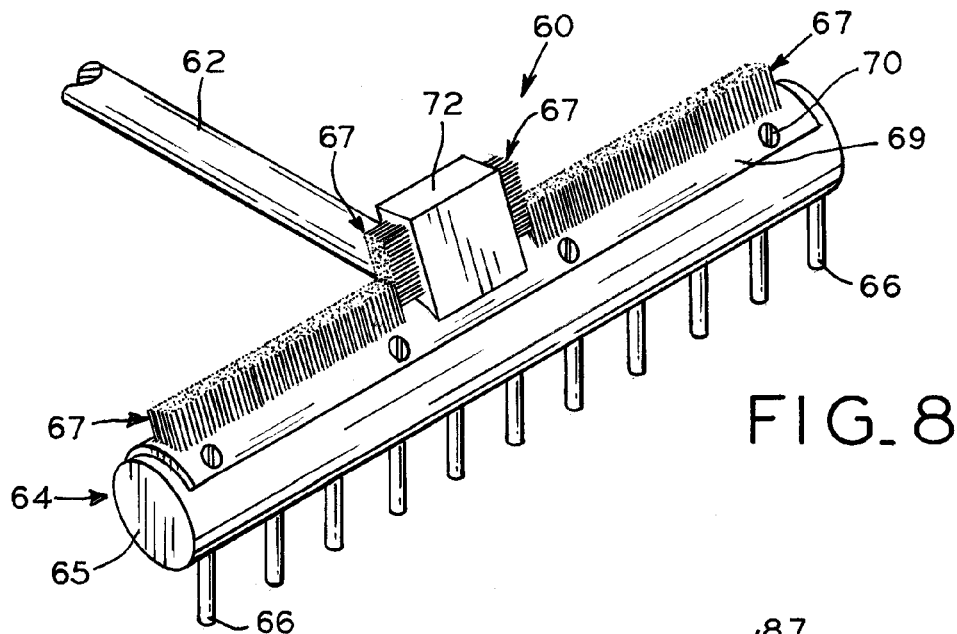
FIG_8
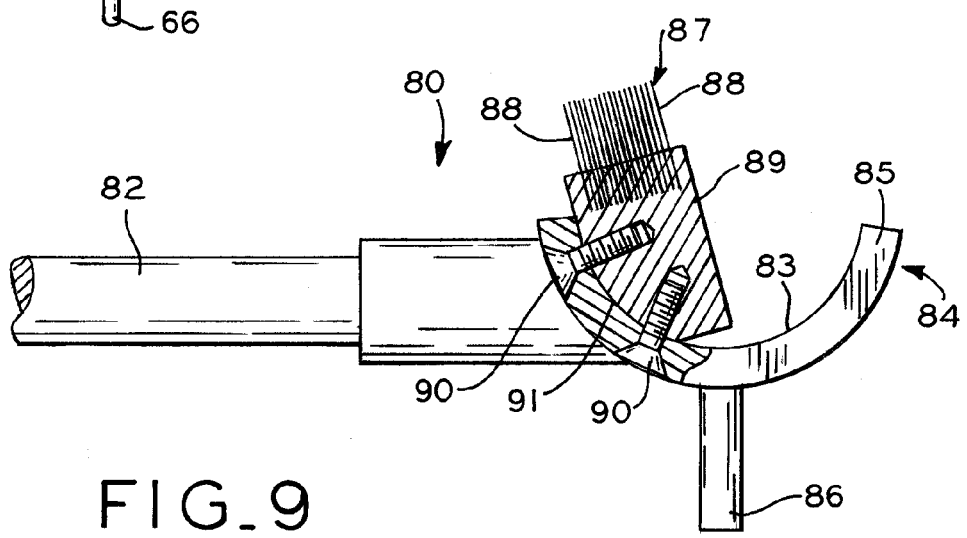
FIG_9

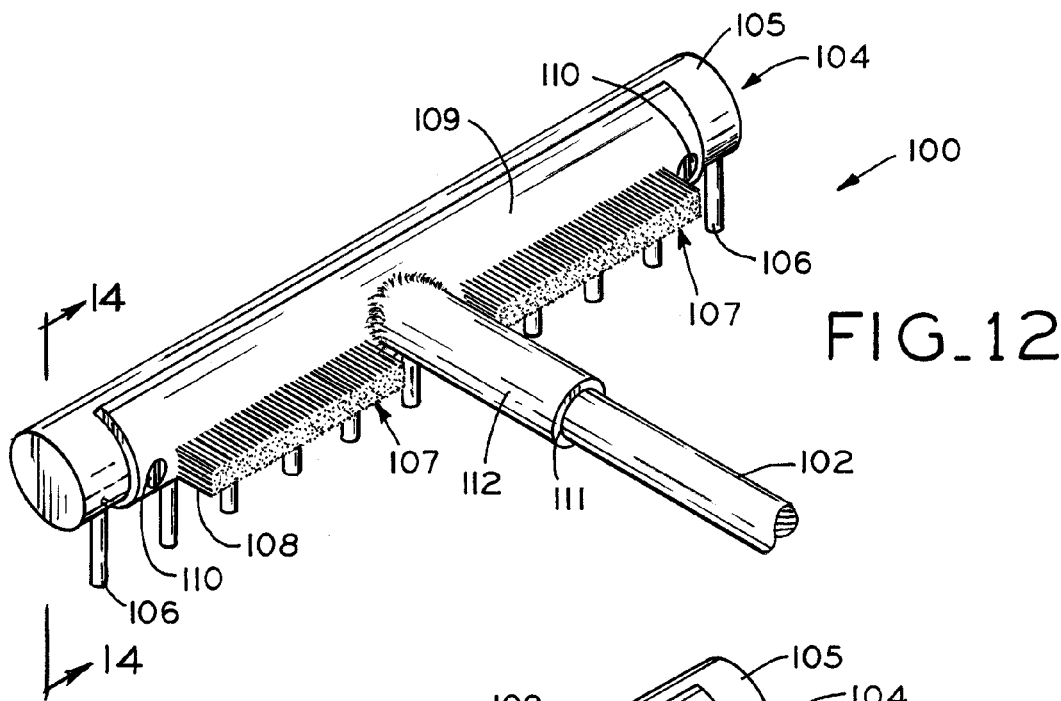
FIG_12
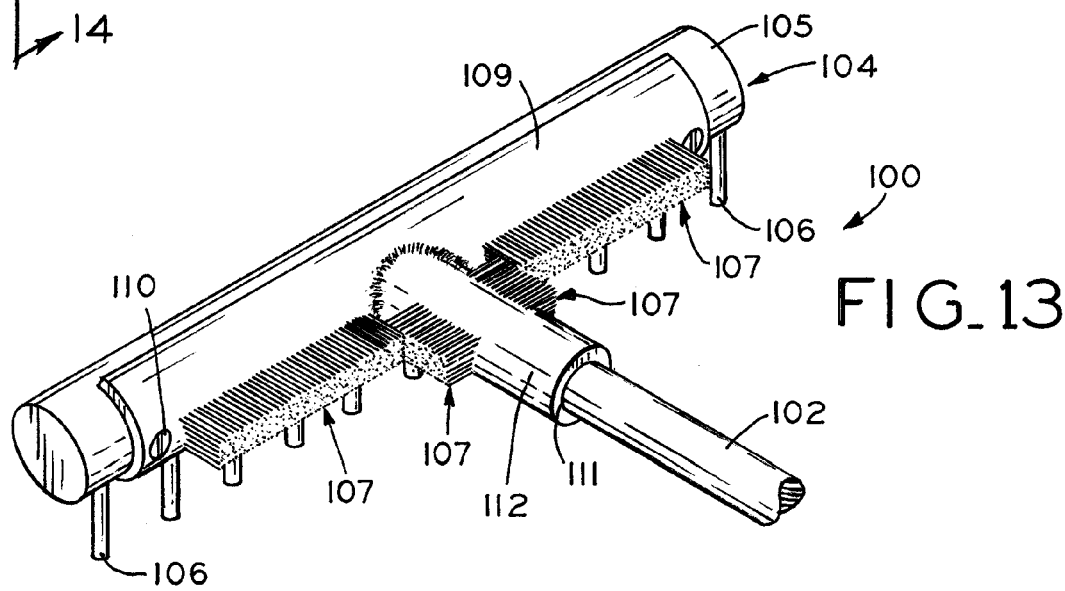
FIG_13
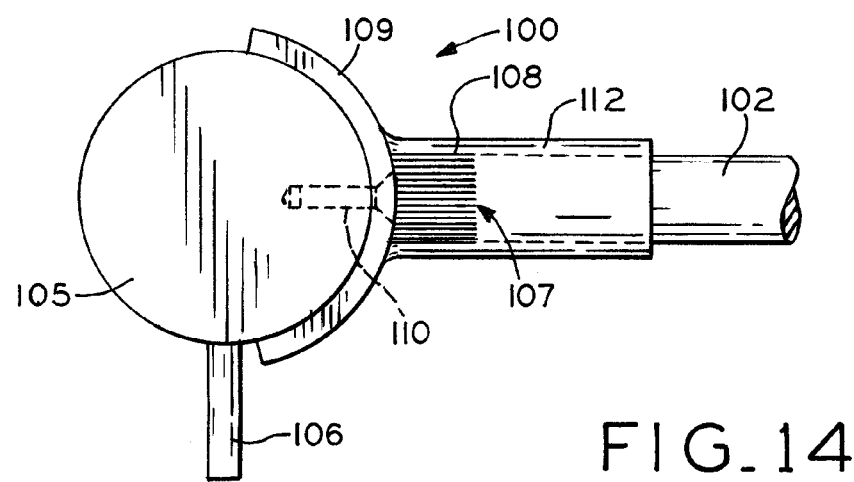
FIG_14

SHOE CLEANING SAND RAKE

BACKGROUND

1. Field of the Invention

The present invention relates to sand rakes, and, more particularly, to sand rakes adapted for cleaning shoes.

2. Description of the Prior Art

During a typical round of golf, a player may find his or her golf ball in a bunker. In order to continue play, the player must hit a shot from the bunker which normally requires a player to stand in the sand. After advancing the golf ball out of the bunker, the player exits the bunker and may have sand stuck to or lodged near or on the sole of the player's golf shoes, i.e., golf spikes. Common courtesy in the game of golf provides that the player or the player's caddy should rake the bunker after exiting to provide a smooth surface for the next player to hit from the bunker. Although the bunker is thus restored to its prior condition, a player's golf shoes or a caddy's shoes remain encumbered with sand on or near the soles. The sand stuck or lodged on the player's shoes is often tracked onto the green, next to which most bunkers are situated, thereby possibly encumbering his or her own putting line or another player's putting line. Also, if the bunker is distant from the green, e.g., next to or in the fairway, the sand stuck or lodged on the player's shoes may hinder the player's footing and stability for the next shot. The player usually must walk to the next tee box to find a shoe cleaning station to remove the sand from the player's shoes, or, alternatively, the player must wait until the round is completed and clean the sand from the player's shoes at the shoe cleaning station near the clubhouse. Alternatively, the player may try to remove the sand from his or her shoes by tapping his or her shoes with the golf club used to hit the sand shot, thereby risking injury to the player's ankle or foot as well as damage to the golf shoes.

SUMMARY

The present invention generally provides a sand rake which serves two purposes: 1) raking the sand in a bunker to provide a smooth sand surface; and 2) efficient and safe removal of the sand trapped or lodged on or near the soles of a player's golf shoes. Advantageously, the dual purpose sand rake may be used to conveniently clean the player's shoes before he or she steps foot on the putting green, thereby reducing the amount of sand and other debris tracked onto the green, or, alternatively, before the player attempts another shot, thereby enhancing the player's footing. The sand rake removes the need for the player to walk to the next tee box to clean his or her shoes before finishing the current hole, or, alternatively, removes the need for the player to wait until the round is finished to clean his or her shoes. Moreover, the sand rake removes the need for the player to tap his or her shoes with the golf club, thereby eliminating the risk of injury to the player's ankle or foot as well as damage to the golf shoes.

In one form thereof, the present invention provides a sand rake adapted for cleaning shoes, including a handle; and a rake head connected to the handle, the rake head including a plurality of tines connected to and extending from the rake head in a first direction, and at least one brush extending from the rake head in a second direction different from the first direction.

In another form thereof, the present invention provides a sand rake adapted for cleaning shoes encumbered with sand or other debris, including a handle; and a rake head connected to the handle, the rake head including raking means for raking the sand connected to and extending from the rake head in a first direction, and cleaning means for removing sand or other debris from the shoes, the cleaning means connected to the rake head, the cleaning means extending from the rake head in a second direction different from the first direction.

In yet another form thereof, the present invention provides a method for preventing sand from being tracked from a bunker to a green in a golf course environment, the method including the steps of providing a sand rake adapted for cleaning shoes, the rake including a handle and a rake head connected to the handle, the rake head including a plurality of tines connected to and extending from the rake head in a first direction, and at least one brush extending from the rake head in a second direction different from the first direction; and subsequent to stepping in the bunker and prior to stepping on the green, brushing a sole portion of a shoe with the at least one brush of the sand rake to dislodge sand particles from the sole portion.

BRIEF DESCRIPTION OF THE DRAWINGS

The above mentioned and other features and objects of this invention, and the manner of attaining them, will become more apparent and the invention itself will be better understood by reference to the following description of exemplary embodiments of the invention taken in conjunction with the accompanying drawings, wherein:

FIG. 1 is a perspective view of a sand rake according to one embodiment;

FIG. 2 is a side view of the rake head and a portion of the handle of the sand rake of FIG. 1;

FIG. 3 is an exploded side view of a rake head with a brush attachment in an alternative embodiment sand rake;

FIG. 4 is a partial perspective view of the sand rake of FIG. 3;

FIG. 5 is a partial perspective view of the sand rake of FIG. 3, further illustrating an extension piece on the brush attachment;

FIG. 6 is a side view of a rake head with a brush attachment in another alternative embodiment sand rake, further illustrating a partial cross-sectional view of fasteners extending into the rake head;

FIG. 7 is a partial perspective view of the sand rake of FIG. 6;

FIG. 8 is a partial perspective view of the sand rake of FIG. 6, further illustrating an extension piece on the brush attachment;

FIG. 9 is a side view of a rake head with a brush attachment in yet another alternative embodiment sand rake, further illustrating a partial cross-sectional view of fasteners extending into the brush attachment;

FIG. 12 is a partial perspective view of a still further alternative embodiment sand rake;

FIG. 13 is a partial perspective view of the sand rake of FIG. 12, further illustrating the brushes extending along the extension portion of the brush attachment; and FIG. 14 is a side view of the sand rake of FIG. 12 taken along line 14-14.

Figure 10:
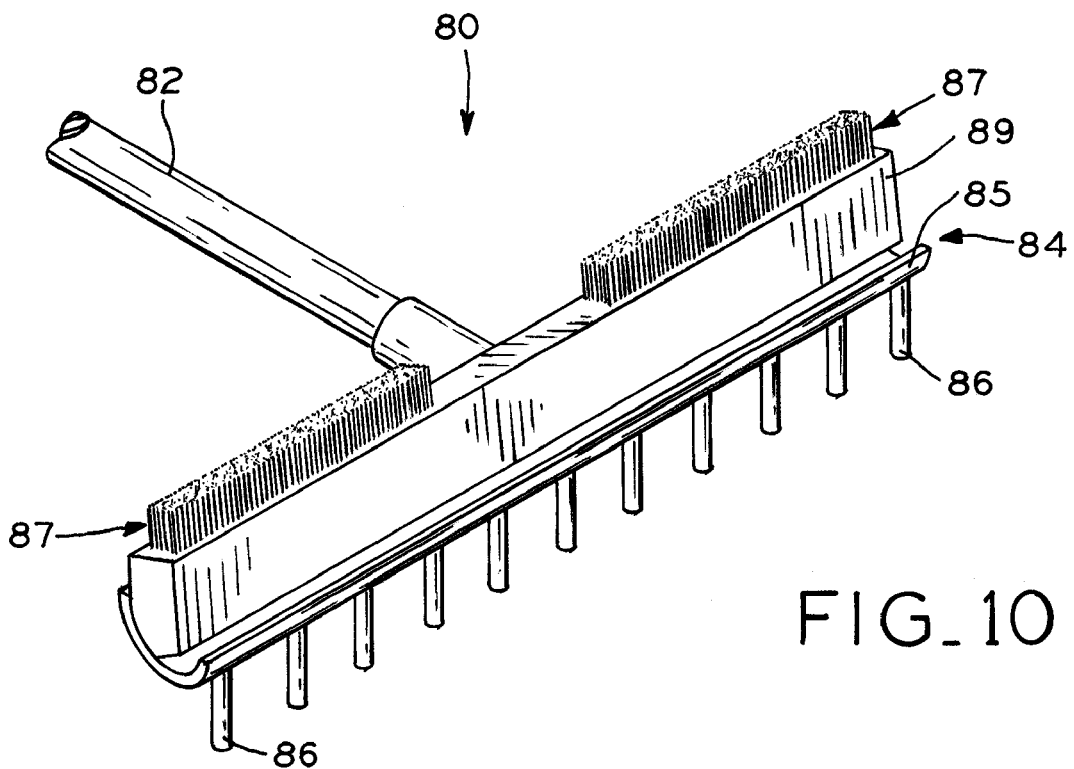
FIG. 10 is a partial perspective view of the sand rake of FIG. 9.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, and such exemplifications are not to be construed as limiting the scope of the invention in any manner.

DETAILED DESCRIPTION

The embodiments disclosed below are not intended to be exhaustive or limit the invention to the precise forms disclosed in the following detailed description. Rather, the embodiments are chosen and described so that others skilled in the art may utilize their teachings.

The present invention generally provides a sand rake which serves two purposes: 1) raking the sand in a bunker to provide a smooth sand surface; and 2) efficient and safe removal of the sand trapped or lodged on or near the soles of a player's golf shoes. Advantageously, the dual purpose sand rake may be used to conveniently clean the player's shoes before he or she steps foot on the putting green, thereby reducing the amount of sand and other debris tracked onto the green. The sand rake removes the need for the player to walk to the next tee box to clean his or her shoes before finishing the current hole, or, alternatively, removes the need for the player to wait until the round is finished to clean his or her shoes. Moreover, the sand rake removes the need for the player to tap his or her shoes with the golf club, thereby eliminating the risk of injury to the player's ankle or foot as well as damage to the golf shoes. As used throughout this document, the term brush is meant to denote a brush for cleaning golf shoes, such as those commercially available from Par Aide Products Co. of St. Paul, Minn. For example, the term brush as used in this context is a device having a large plurality of independent bristles grouped closely together and effective to dislodge sand from a sole portion of a golf shoe. The brush will generally not allow sand particles to pass through the brush, but rather will dislodge sand and other debris from the sole portion of the shoe.

Referring to FIG. 1, sand rake 20 is shown including handle 22 with handle grip 23 and rake head 24 connected to handle 22. The connection between handle 22 and rake head 24 may comprise any suitable connection, for example, the connection may include a threaded engagement wherein handle 22 includes a threaded projection and rake head 24 includes a threaded recess capable of cooperating engagement with the threads on handle 22. Alternatively, handle 22 and rake head 24 may be held together by a friction-fit engagement, for example. As shown in FIG. 2, rake head 24 includes rake head body 25 having rake head axis 32 and handle 22 includes handle longitudinal axis 30 disposed substantially perpendicular to rake head axis 32. Rake head body 25 includes a plurality of rake tines 26 extending therefrom in a general direction along rake head axis 32. Rake tines 26 may be formed into various shapes and the number of tines 26 employed on rake head body 25 may be varied. In one embodiment, rake tines 26 may have a cross-sectional dimension of between ⅛ in. and ½ in., e.g., if rake tines 26 have a substantially circular cross-section, the dimension may be the diameter of the cross-section. In another embodiment, rake tines 26 may taper in cross-sectional size from a larger cross-section near rake head body 25 to a smaller cross-section distant from rake head body 25. Rake tines 26 may include spacing between each tine 26 of approximately ¼ in. to 2 in. Handle 22 and rake head body 25 may be comprised of metal, plastic, wood, aluminum, a composite material, or any other suitable material.

Rake head body 25 also has brushes 27 extending therefrom each of which includes a plurality of bristles 28. Each brush 27 extends from rake head body 25 at an angle $\theta$ with respect to rake head axis 32. Angle $\theta$ may be any angle suitable for the purpose of cleaning golf shoes, and, in one embodiment, angle $\theta$ is between about 0° and 90°, or, about 45°. In certain embodiments, e.g., embodiments in which the shoe cleaning feature of the rake is meant to be used with handle 22 resting on the ground, brushes 27 are most effective when angle $\theta$ is at least less than 90°, i.e., when brushes 27 are at least slightly above a horizontal orientation of brushes 27 with respect to the ground when tines 26 are directed toward the ground. However, if rake 20 is desired to be used in another fashion, for example, when handle 22 is perpendicular to the ground surface, brushes 27 could be located at an angle $\theta$ of 90°, as described below (FIGS. 12-13). Bristles 28 may be comprised of metal, plastic, a composite, foam, or any other material suitable for cleaning golf shoes. Bristles 28 may be integrally formed with rake head body 25 or may be inserted into apertures (not shown) provided in rake head body 25 after body 25 is formed. In the latter instance, bristles 28 may be held in rake head body 25 by a friction-fit engagement or by a glue or glue-like substance.

The configuration of tines 26 and brushes 27 allows a golfer to first rake the bunker with rake 20 after hitting a shot therefrom and then lay rake 20 on the ground in the usual and correct manner, i.e., with tines 26 directed toward the ground. With tines 26 directed toward the ground, a golfer may rub or clean his or her shoes on brushes 27 which are in an ideal orientation for such cleaning. Moreover, the force exerted by the golfer on rake head 24 while cleaning his or her shoes forces tines 26 to dig into the ground and further stabilize rake head 24 for cleaning the golf shoes with brushes 27. Alternatively, rake 20 may be held generally vertically with respect to the ground, for example, at an approximately 30° angle from vertical, such that tines 26 may partially engage the ground and the player may efficiently clean his or her shoes on brushes 27.

Referring now to FIGS. 3-4, in another embodiment, sand rake 40 is shown which, except as described below, is substantially similar in structure and operation to sand rake 20 (FIGS. 1-2) described above. Sand rake 40 includes handle 42 and rake head 44. Rake head 44 includes rake head body 45 having rake head axis 52 and rake head recess 41 defined by rake head recess wall 43. Rake head body 45 also includes rake head aperture 53 extending along a chord of the cross-sectional circle defined by rake head body 45. Brush attachment 49 is shaped to fit within recess 41 and has surface 55 which, in certain embodiments, contacts wall 43 of recess 41 upon insertion of brush attachment 49 into recess 41. Brushes 47, each having a plurality of bristles 48, extend from brush attachment 49 and are disposed at an angle $\alpha$ which may be any angle suitable for the purpose of cleaning golf shoes. In one embodiment, angle $\alpha$ may be between about 0° and 90°, or, about 45°. In certain embodiments, e.g., embodiments in which the shoe cleaning feature of the rake is meant to be used with handle 42 resting on the ground, brushes 47 are most effective when angle $\alpha$ is at least less than 90°, i.e., when brushes 47 are at least slightly above a horizontal orientation of brushes 47 with respect to the ground when tines 46 are directed toward the ground. The efficiency of brushes 47 may increase, depending on the orientation of brushes 47, as angle $\alpha$ decreases, i.e., moves closer to vertical or 0°. However, if rake 40 is desired to be used in another fashion, for example, when handle 42 is perpendicular to the ground surface, brushes 47 could be located at an angle $\alpha$ of 90°, as described below (FIGS. 12-13). Brush attachment 49 also includes aperture 51. Upon insertion of brush attachment 49 into recess 41, pin 54 is inserted through rake head aperture 53 and brush connector aperture 51 to secure brush attachment 49 to rake head body 45. Pin 54 may form an interference fit within apertures 51 and 53 to secure brush attachment 49 to rake head body 45. In such a configuration, pin 54 may also be tapered and apertures 51 and 53 correspondingly tapered to match that of pin 54. Alternatively, pin 54 may comprise a nut and bolt arrangement (not shown) or a threaded engagement (not shown). In one embodiment, the surface of brush attachment 49 on which bristles 48 are positioned is flush with the circumference of rake head body 45 to form a continuous circular cross-section. Rake head body 45 includes a plurality of rake tines 46 extending therefrom in a general direction along rake head axis 52. An advantage of rake 40 is that brush attachment 49 may be replaced. For example, brushes 47 of brush attachment 49 may become worn over time. The configuration of rake 40 permits easy replacement of brushes 47 by simply removing the old brush attachment 49 and replacing it with a new brush attachment 49.

In an alternative embodiment shown in FIG. 5, brush attachment 49 may include extension piece 56 integrally formed therewith or later attached thereto with brushes 47 on opposing sides thereof to provide at least one additional surface of bristles 48 upon which a golfer may clean his or her shoes, i.e., the additional surfaces facilitate cleaning the sides of the golf shoes.

Referring now to FIGS. 6-7, in yet another embodiment, sand rake 60 is shown which, except as described below, is substantially similar in structure and operation to sand rake 20 (FIGS. 1-2) described above. Sand rake 60 includes handle 62 and rake head 64. Rake head 64 includes rake head body 65 having a plurality of rake tines 66 extending therefrom. Brush attachment 69 is connected to rake head body 65 via fasteners 70 inserted through apertures in brush attachment 69 and threaded or driven into rake head body 65. In one embodiment, brush attachment 69 has an arcuate shape to match the curvature of rake head body 65 to ensure touching engagement between brush attachment 69 and rake head body 65. Brushes 67 extend from brush attachment 69 and include a plurality of bristles 68. An advantage of rake 60 is that brush attachment 69 provides retrofit capability to existing rakes. For example, by simply drilling or punching a few fastener holes in an existing rake, brush attachment 69 may be retrofitted onto the existing rake to produce rake 60.

In an alternative embodiment shown in FIG. 8, brush attachment 69 may include extension piece 72 integrally formed therewith or later attached thereto with brushes 67 on opposing sides thereof to provide at least one additional surface of bristles 68 upon which a golfer may clean his or her shoes.

Referring now to FIGS. 9-10, in a still further embodiment, sand rake 80 is shown which, except as described below, is substantially similar in structure and operation to sand rake 20 (FIGS. 1-2) described above. Sand rake 80 includes handle 82 and rake head 84 having rake head body 85 with a plurality of rake tines 86 extending therefrom. As shown in FIG. 9, rake head body 85 includes a hollow interior defined by surface 83. Brush attachment 89 has surface 91 which mates with the arcuate shape of surface 83. Fasteners 90 extend through apertures in rake head body 85 and are threaded or driven into brush attachment 89. Brush attachment 89 has brushes 87 extending therefrom away from rake head body 85. Each brush 87 includes a plurality of bristles 88.

Figure 11:
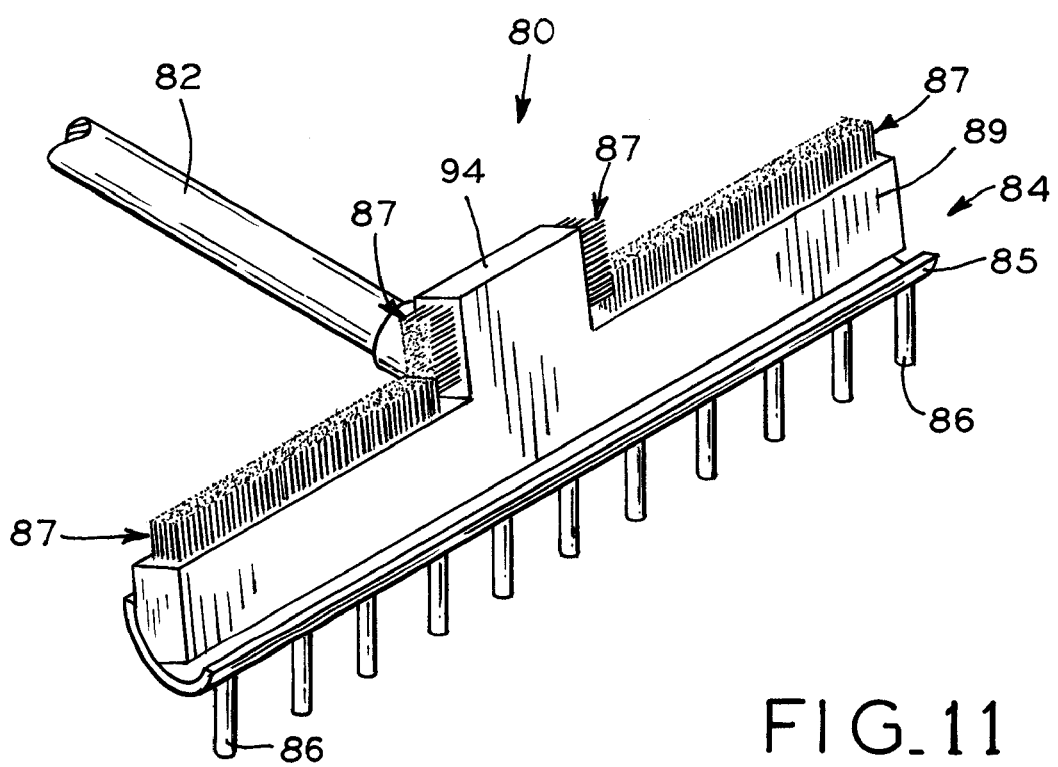
FIG. 11 is a partial perspective view of the sand rake of FIG. 9, further illustrating an extension piece on the brush attachment.

In an alternative embodiment shown in FIG. 11, brush attachment 89 may include extension piece 94 integrally formed therewith or later attached thereto with brushes 87 on opposing sides thereof to provide at least one additional surface of bristles 88 upon which a golfer may clean his or her shoes.

Referring now to FIGS. 12 and 14, in another alternative embodiment, sand rake 100 is shown which, except as described below, is substantially similar in structure and operation to sand rake 20 (FIGS. 1-2) described above. Sand rake 100 includes handle 102 and sand rake head 104. Sand rake head 104 includes rake head body 105 with a plurality of rake tines 106 extending therefrom. Brush attachment 109 includes aperture 111 in extension portion 112 sized to slidably engage handle 102. Brush attachment 109 is slid down handle 102 until the arcuate shape of brush attachment 109 mates with the arcuate surface of rake head body 105 and handle 102 extends out aperture 111 in extension portion 112. Brush attachment 109 is secured to rake head body 105 via fasteners 110 inserted through apertures in brush attachment 109 and threaded or driven into rake head body 105. Brushes 107 extend from brush attachment 109 in a direction away from rake head body 105. Each brush 107 includes a plurality of bristles 108.

In an alternative embodiment shown in FIG. 13, brush attachment 109 may include brushes 107 on opposing sides of extension portion 112 to provide at least one additional surface of bristles 108 upon which a golfer may clean his or her shoes. The embodiments of FIGS. 12-14 advantageously allow the player to use rake 100 while holding rake 100 such that handle 102 is substantially vertical to the ground such that brushes 107 are easily accessed.

Brush attachment 109 may alternatively include brushes 107 on a portion thereof which essentially extend from rake head body 105 in a direction opposite to the direction of extension of tines 106, thereby making rake 100 more usable while handle 102 is horizontal to the ground.

Advantageously, brush attachment 69 (FIGS. 6-8), brush attachment 89 (FIGS. 9-11), and brush attachment 109 (FIGS. 12-14) may easily allow existing sand rakes to be retrofitted to include brush attachments.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sand rake adapted for cleaning shoes, comprising:
   a handle;
   a rake head connected to said handle, said rake head including a plurality of tines connected to and extending from said rake head in a first direction, and a brush comprising a plurality of first bristles grouped closely together along a pair of orthogonal axes, said first bristles of said brush extending from said rake head in a second direction different from said first direction; and
   an extension extending from said rake head, said extension including a second brush comprising a plurality of second bristles, said second bristles extending in a third direction orthogonal to said second direction, said second direction in which said first bristles extend intersecting said third direction in which said second bristles extend, whereby, when said first bristles are used to clean a shoe bottom, said second bristles can be used to simultaneously clean a shoe side.

2. The sand rake of claim 1, wherein said at least one brush is integrally formed with said rake head.

3. The sand rake of claim 1, wherein said rake head further comprises a brush attachment structure, said brush attachment structure including said first brush, said brush attachment structure selectively connected to said rake head.

4. The sand rake of claim 3, wherein said brush attachment structure is connected to said rake head with at least one fastener.

5. The sand rake of claim 3, wherein said brush attachment structure comprises a surface contoured to match a surface of said rake head.

6. The sand rake of claim 3, wherein said brush attachment structure is connected to said rake head via a friction-fit engagement between said brush attachment structure and said rake head.

7. The sand rake of claim 1, wherein said first direction and said second direction form an angle therebetween, said angle measuring between approximately 45° and 180°.

8. The sand rake of claim 1, wherein said handle includes a longitudinal axis and said rake head includes an axis perpendicular to said handle longitudinal axis, said second direction and said rake head axis forming an angle therebetween, said angle measuring between approximately 0° and 90°.

9. A sand rake adapted for cleaning shoes encumbered with sand or other debris, comprising:
    a handle; and
    a rake head connected to said handle, said rake head comprising:
        raking means for raking the sand connected to and extending from said rake head in a first direction;
        first cleaning means for removing sand or other debris from the shoes, said first cleaning means connected to said rake head, said first cleaning means extending from said rake head in a second direction different from said first direction, and
        second cleaning means connected to said rake head, said second cleaning means extending in a third direction orthogonal to said second direction, said second direction in which said first cleaning means extends intersecting said third direction in which said second cleaning means extends, whereby when said first cleaning means is used to clean a shoe bottom, said second cleaning means can be used to simultaneously clean a shoe side.

10. The sand rake of claim 9, wherein said cleaning means is integrally formed with said rake head.

11. The sand rake of claim 9, wherein said rake head further comprises a cleaning means attachment structure, said attachment structure including said first cleaning means, said attachment structure selectively connected to said rake head.

12. The sand rake of claim 11, wherein said attachment structure is connected to said rake head via a friction-fit engagement between said attachment structure and said rake head.

13. The sand rake of claim 11, wherein said attachment structure is connected to said rake head with at least one fastener.

14. The sand rake of claim 11, wherein said attachment structure comprises a surface contoured to match a surface of said rake head.

15. The sand rake of claim 9, wherein said first direction and said second direction form an angle therebetween, said angle measuring between approximately 45° and 180°.

16. The sand rake of claim 9, wherein said handle includes a longitudinal axis and said rake head includes an axis perpendicular to said handle longitudinal axis, said second direction and said rake head axis forming an angle therebetween, said angle measuring between approximately 0° and 90°.

* * * * *